June 22, 1937.  D. CATLEY  2,084,431
COUPLING FOR HOSE AND LIKE PIPING
Filed July 31, 1936
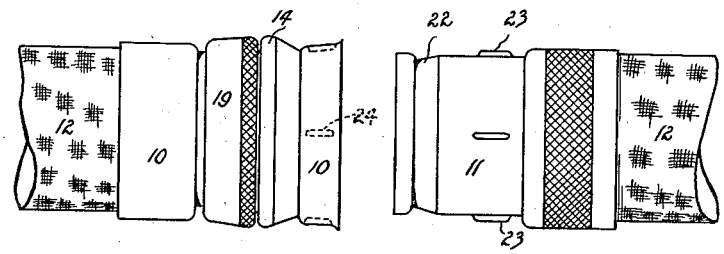
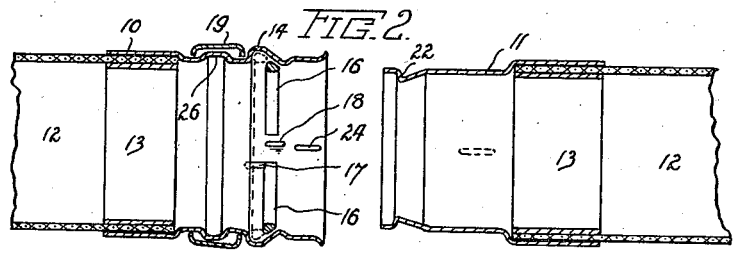
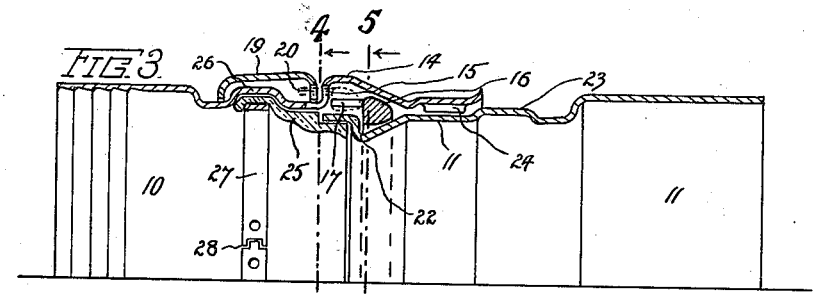
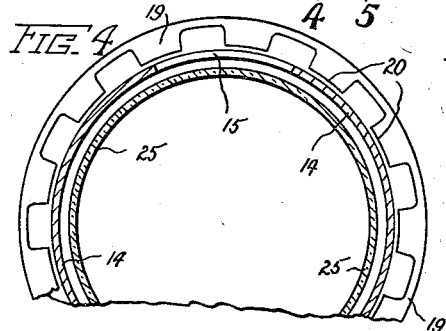
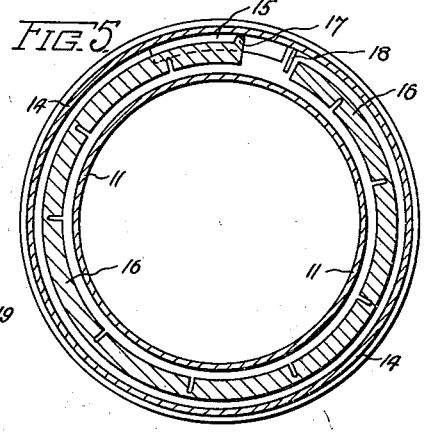
INVENTOR
DOUGLAS CATLEY
By Emil Bönnelycke
ATTORNEY Patented June 22, 1937

2,084,431

UNITED STATES PATENT OFFICE 2,084,431

COUPLING FOR HOSE AND LIKE PIPING

Douglas Catley, Wellington, New Zealand

Application July 31, 1936, Serial No. 93,737. In New Zealand August 17, 1935

4 Claims. (Cl. 285—168)

This invention has reference to a new form of coupling designed more particularly for use in respect of fire hose for joining lengths together, but which is useful also in all other analogous circumstances in which lengths of hose or other piping are required to be connected together and disconnected at will.

The invention provides coupling means of an effective form that are light and convenient for handling and which by their nature allow for the coupling being effected quickly with a locking action by merely engaging the two members, and allow for it being broken merely by a twisting action of a device upon one member combined with a longitudinal compression of the two members, and then the withdrawal of one member from the other.

The coupling members as made according to this invention, are of such a form that they may be very conveniently formed from sectional lengths of light metallic tubing of the necessary diameter, and shaped to the required form by spinning operations effected on the well known principles. They may however be formed in any other known manner as by casting, or machining from the solid.

In this invention the two coupling members are made of tubular nature and each has its outer end made to receive the end of a hose length which is secured thereto by any of the usual methods. The inner ends are made to telescopically engage one with the other, male and female, or spigot and socket, fashion, and for the purposes of description are hereinafter referred to respectively as the spigot member and the socket member.

The essential feature of novelty in the invention is concerned with the employment of an expansible and contractible locking ring that is fitted into an internal peripheral groove in the socket member positioned a distance in from its end, and the formation of the spigot member end with a peripheral external groove at a distance in from its end, designed so that as the spigot member is pushed home into the socket member the locking ring will expand to permit of it passing until its groove is coincident with the ring, when the ring will contract into its groove and form a wedging lock between the surfaces of both grooves that becomes more effective as the internal fluid pressure increases. The features of the invention are also concerned with means for expanding the locking ring again so that the two members may be drawn apart and also with the details of construction whereby the locking ring is caused to perform its functions.

In fully describing the invention, reference will be made to the accompanying drawing, in which:—

Figure 1 is an elevation of the two coupling members shown drawn apart.

Figure 2 is a longitudinal section thereof.

Figure 3 is a longitudinal section of one half of the coupling members shown in the coupled position, and drawn on an enlarged scale.

Figure 4 is a partial cross sectional elevation of the coupling taken on the line 4—4 of Figure 3 and looking to the left of such line.

Figure 5 is a cross sectional elevation taken on the line 5—5 of Figure 3 and looking to the left of such line.

Figure 6 is a view of the locking ring.

10 is the tubular socket member and 11 the tubular spigot member of the coupling combination. Each of these is formed by spinning, casting, or machining, as may be desired and in accordance with the strength, size and weight of coupling required to meet the requirements of each case. Each member also, at its back end, receives an end of the hose piping 12 which fits into an expanded portion of the internal diameter, the surface of which may be serrated, as shown in Figure 3, and is then locked in the member by a sleeve 13 expanded within the hosing and which sleeve may be formed with corrugations extending in its length to obtain its distention and gripping action. Other ways of attaching the hose ends to the coupling members, may however be adopted.

The socket member 10 is formed at a distance in from its end with an internal peripheral groove 14 that is made to taperingly increase in diameter as it extends from the end of the member inwardly and then is formed with a radial face at its back edge, which is so formed as to provide a radial face also on the outside of the member. This face is formed with a slot 15 extending circumferentially for a distance and opening to a groove formed on the outside of the member. In this groove 14 there is fitted a locking ring 16, which forms the locking ring beforementioned. It is made of a nature such that it normally contracts in diameter so that its inner periphery is within the radius of the outer edge of the groove 14, but is capable of being expanded within the groove so that it is wholly retired into the said groove, as indicated by the dotted lines in Figure 2. For this purpose the ring is made of springy nature and with unjoined ends, as shown in Figures 2, 5 and 6, in order that by forcing the ends apart, the ring will be distended. The ring also is shaped so that its inner peripheral face inclines inward radially from its front to its rear edge. In addition, it is made of a width that is less than that of the groove.

One end of the ring 16 has a tooth 17 affixed thereto to extend laterally of the ring and to pass through the aforesaid slot 15 in the groove side, this tooth and slot being so made relatively that the tooth will project through the slot to the ouside with the ring contracted to normal, or expanded and pushed back in the groove. The member 10 is formed with an inwardly extending radial stop piece 18 which projects across the other end of the ring 16 and serves to engage such end and prevent the ring rotating when the toothed end of the ring is engaged and moved circumferentially away from the other end, thereby to ensure of the ring being expanded when such movement is imparted to the tooth end.

Encircling the member 10, on the rear side of the groove 14 is a sleeve or collar 19, the edge of which adjacent to the groove face is made with a number of spaced inwardly turned lugs 20, (see more particularly Figure 4) any one of which is designed to engage the said tooth 17 as it projects through the slot 15 and by the turning of the sleeve upon such member, to expand the ring in the manner described. Such engagement with the tooth 17 does not occur, however, until the ring has been moved back in the groove.

The spigot member 11 is made of a diameter at its forward end such that it may pass neatly and freely into the forward end of the member 10 and it is formed at a short distance out from its extremity with a circumferentiol groove 22 in its external periphery made to provide a square shoulder at its front edge. This end of the spigot is designed, when inserted in the socket, to pass into the tapered internal periphery of the locking ring 16 and to open such ring out, until the groove 22 reaches the ring, when the ring in its contraction will close into the groove and by engagement behind its square shoulder, hold the spigot within the socket by an engagement extending all round the circumference of the ring. It then can be freed by pressing the two members together so that the ring 16 moves back in the groove 14 and then turning the sleeve 19 to distend the collar and holding it distended while the two members are pulled apart.

In order to prevent any rotation of the member 10 while the sleeve 19 is being turned, it is designed to interlock with the spigot member in rotative engagement by forming the spigot with a number of external longitudinal ribs 23, and the inside of the mouth of the socket with the ribs 24 which by engagement one with the other, hold the spigot and socket from relative rotation. Thus by gripping the spigot with one hand and the sleeve upon the socket member with the other, the sleeve may be effectually turned to open out the ring 16 and allow the coupling to be broken. These ribs are, however, relatively so placed as to permit of the independent rotation of the two members when the joint is in the normal extended condition.

The socket member 10 is provided with the necessary rubber washer collar 25 to ensure of the coupling being made watertight. This is shown in Figure 3 and is held at one edge by being clamped within an internal peripheral groove 26 situated beyond the groove 14 of this socket by means of the split clamping ring 27 expanded in such groove and having interlocking ends, as shown at 28. The washer collar then extends freely along within the socket member towards its mouth and overlaps the inside of the spigot member in the manner shown to ensure that the water pressure, as it flows in the direction of the arrow, will force the washer outwards to seal the joint. This washer may be made of the stepped formation shown in order to fit over the end of the spigot member.

I claim:—

1. Pipe coupling means comprising a tubular spigot member formed with an external peripheral groove a distance back from its end, a tubular socket member adapted to receive the spigot member and formed with an internal peripheral groove a distance back from its end, which groove is made with a slot extending circumferentially and opening through to the outside, an expansible ring fitted within the latter groove, adapted to be distended by the passing of the spigot member into the socket member and then to contract into the groove of the socket member, a projection on one end of the said ring extending into the slot of the socket member, and a sleeve mounted to turn upon the socket member and made to engage such projection to thereby distend the said expansible ring to free the socket member when the sleeve is turned upon the socket member.

2. In pipe coupling means according to claim 1, a socket member in which the internal peripheral groove is formed to taperingly increase in diameter from its front to its rear and has a radial rear wall, extending also upon the outer peripheral surface of the socket member, in which the said circumferential slot is formed and is also provided with a stop piece projecting inwardly, and in which the expansible ring fitted into such groove is made with divided ends positioned on the respective sides of such stop piece and with a tooth on one of its ends projecting laterally into such slot, and in which also the sleeve mounted upon the outside of the socket member to turn thereon is shaped at its forward edge with a series of inwardly turned lugs spaced circumferentially apart and positioned adjacent to the radial rear wall of the aforesaid groove.

3. Pipe coupling means according to claim 1, in which the said spigot member and the said socket member on their respective engaging faces are formed with longitudinally extending ribs, substantially as and for the purposes specified.

4. Pipe coupling means according to claim 1, in which a rubber washer sleeve is disposed within the socket member and has its back edge secured to the inside of such member at a position rearward of the peripheral groove thereof, and its other end extending freely forwardly within this member.

DOUGLAS CATLEY.